United States Patent [19]

Werley

[11] Patent Number: 4,915,127
[45] Date of Patent: Apr. 10, 1990

[54] COMPRESSED GAS REGULATOR WITH PRESSURIZED SEALED BONNET

[75] Inventor: Barry L. Werley, Allentown, Pa.

[73] Assignee: Air Products and Chemicals, Inc., Allentown, Pa.

[21] Appl. No.: 357,752

[22] Filed: May 26, 1989

Related U.S. Application Data

[63] Continuation of Ser. No. 169,810, Mar. 18, 1988, abandoned.

[51] Int. Cl.$^4$ ............................................. G05D 16/06
[52] U.S. Cl. ................................. 137/505.42; 137/71; 137/906; 169/58; 169/70
[58] Field of Search ........................ 137/505.42, 505.37, 137/505.45, 906, 71; 169/58, 70

[56] References Cited

U.S. PATENT DOCUMENTS

| | | | |
|---|---|---|---|
| 1,618,815 | 2/1927 | Cory et al. | 137/505.42 X |
| 2,091,051 | 8/1937 | Mesinger | 137/505.42 X |
| 2,158,068 | 5/1939 | Grove . | |
| 2,164,095 | 6/1939 | Thomas et al. . | |
| 2,202,313 | 5/1940 | Grove . | |
| 2,212,709 | 8/1940 | Grove | 137/505.42 |
| 2,248,592 | 7/1941 | Stettner . | |
| 2,259,280 | 10/1941 | Wile | 137/505.42 |
| 2,261,364 | 11/1941 | Grove | 137/505.37 X |
| 2,941,543 | 6/1960 | Kleczek | 137/505.37 X |
| 3,437,110 | 4/1969 | Birdwell . | |
| 4,232,742 | 11/1980 | Dick | 169/58 |
| 4,744,387 | 5/1988 | Otteman | 137/505.42 X |
| 4,763,841 | 8/1988 | Häfner et al. | 137/906 X |

FOREIGN PATENT DOCUMENTS

| | | | |
|---|---|---|---|
| 1247388 | 10/1960 | France . | |
| 350161 | 12/1960 | Switzerland | 137/505.42 |
| 12999 | 8/1887 | United Kingdom | 137/505.42 |
| WO87/4765 | 8/1987 | World Int. Prop. O. | 137/505.42 |

Primary Examiner—Stephen M. Hepperle
Attorney, Agent, or Firm—James C. Simmons; William F. Marsh

[57] ABSTRACT

A gas regulator includes a housing having a high pressure chamber with an inlet passage thereto, a low pressure chamber with an outlet passage therefrom, and an orifice extending between the high pressure chamber and the low pressure chamber. The low pressure chamber is open at one end and an enclosed bonnet is mounted on the housing across the open end of the low pressure chamber. A movable pressure sensing/control element is mounted across the open end of the low pressure chamber and separates the low pressure chamber from the bonnet. The bonnet is filled with a gas under pressure which applies a force onto one side of the pressure sensing/control element. A valve plug is in the high pressure chamber and is connected to the pressure sensing/control element so as to be movable toward and away from the orifice to open and close the regulator. A spring is connected to the pressure sensing/control element so as to apply a force thereto opposite to the force applied by the gas in the bonnet. The spring includes means for adjusting the force applied by the spring.

11 Claims, 2 Drawing Sheets

COMPRESSED GAS REGULATOR WITH PRESSURIZED SEALED BONNET

This is a continuation of application Ser. No. 07/169,810 filed Mar. 18, 1988, now abandoned.

FIELD OF THE INVENTION

The present invention relates to a compressed gas regulator, and, more particularly, to a compressed gas regulator having a pressurized, sealed bonnet which eliminates safety hazards resulting from failure of the pressure sensing/control element.

BACKGROUND OF THE INVENTION

Compressed gas regulators operate by reducing a high pressure gas through a variable orifice to a lower delivery pressure. As the pressure of the source drops, the regulator's control valve is automatically adjusted by a pressure sensing element to maintain a constant discharge pressure. The pressure sensing element can be a piston or a flexible diaphragm. Flexible diaphragms are generally preferred for low discharge pressures (less than 200 psig) because they provide more sensitive pressure control compared to pistons, which are rigid diaphragms, of equal area. In order to function adequately, a diaphragm must be thin enough to flex at the operating pressure of the regulator. This also means it must be highly stressed under normal operating conditions.

A major operational problem of flexible diaphragm regulators is rupture of the diaphragm, which can cause loss of the gas into the atmosphere. Diaphragms rupture for various reasons including: weakening caused by fatigue, buckling caused by overpressurization, loss of strength due to corrosion, or combustion when servicing an oxidant. Whatever the cause, a ruptured diaphragm results in the loss of pressure control as well as a discharge through the regulator's bonnet. This discharge is not a safety problem for ordinary inert gases, such as nitrogen, argon, or helium, provided that local ventilation is adequate to prevent asphyxiation. However, discharge of toxic, flammable, oxidizing or corrosive gases into the working area is extremely dangerous. Gases can also escape through the bonnet by leaking through the diaphragm seal. Although this type of discharge is slower than one caused by a diaphragm rupture, it still can be a safety problem for flammable or toxic gases.

A piston controlled regulator experiences less catastrophic failures than flexible diaphragm controlled regulators. A piston controlled regulator is essentially the same as a flexible diaphragm regulator except that the flexible diaphragm is replaced by a piston, which is a rigid type diaphragm. The piston moves in the regulator, rather than flexing, and has a dynamic seal, such as an o-ring, between it and the inside wall of the bonnet. While the piston, which is rigid, does not rupture, leaks can occur at the o-ring seal. Overall, the reliability of the piston is higher than the flexible diaphragm with respect to leaks into the bonnet. The major disadvantage of a piston controlled regulator is low sensitivity relative to flexible diaphragms of equal area. To compensate for this, a much larger piston diameter is required relative to a flexible diaphragm controlled regulator. This makes the piston controlled regulator large in size and more expensive than the flexible diaphragm controlled regulator.

Dome loaded regulators are also less subject to catastrophic failure in that they do not release gas upon diaphragm failure. However, they are inconvenient to use, are expensive, and have other hazards due to potential inadvertent downstream overpressurization. Some typical dome loaded regulators are shown in the following United States and French patents:

U.S. Pat. No. 2,158,068 to M. H. Grove, entitled "Gas Regulator, issued May 16, 1939;

U.S. Pat. No. 2,164,095 to F. E. Thomas, et al., entitled "Air-Pressure Reducing and Regulating Device," issued June 27, 1939;

U.S. Pat. No. 2,202,313 to M. H. Grove, entitled "Fluid Pressure Regulator", issued May 28, 1940;

U.S. Pat. No. 2,248,592 to L. W. Stettner, entitled "Pressure Regulator", issued July 8, 1941;

U.S. Pat. No. 3,437,110 to D. W. Birdwell, entitled "Fluid Pressure Relief Valve," issued Apr. 8, 1969; and French No. 1,247,388 issued October 1960.

Therefore, it would be desirable to have a pressure regulator that would automatically shut off upon failure of the pressure sensing/control element so as to prevent release of any gas which can cause safety problems.

SUMMARY OF THE INVENTION

A compressed gas regulator includes a housing having a high pressure chamber, a low pressure chamber spaced from the high pressure chamber, and an orifice connecting the two chambers. A valve plug is in the high pressure chamber and is movable toward and away from the orifice. A sealed bonnet is mounted on the housing across the low pressure chamber. A movable pressure sensing/control element extends across the low pressure chamber and separates the low pressure chamber from the bonnet. The pressure sensing/control element is connected to the valve plug to control the movement of the valve plug. The bonnet is filled with a gas under pressure which applies a force onto the pressure sensing/control element. Biasing means applies a force to the pressure sensing/control element in a direction opposite to the force applied by the gas in the bonnet.

DETAILED DESCRIPTION OF PREFERRED EMBODIMENTS

Figure 1:
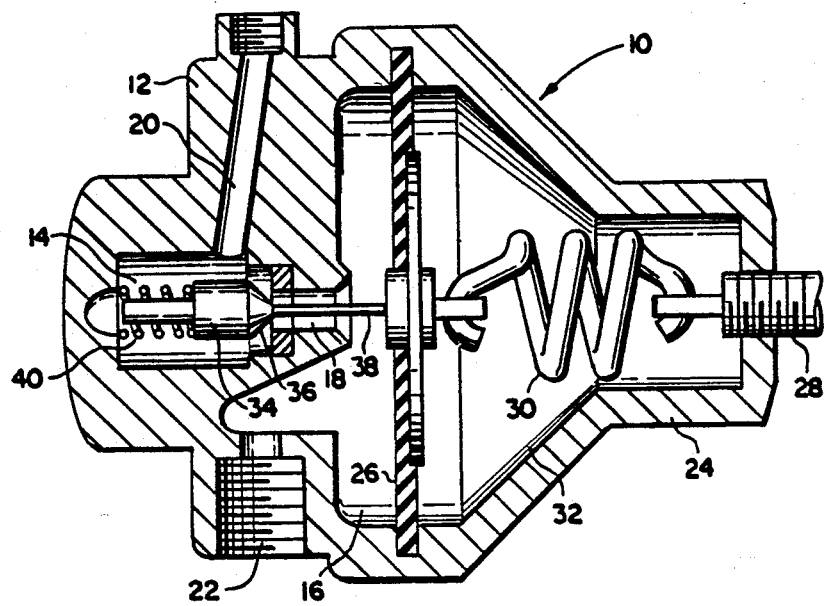
FIG. 1 is a sectional view of one form of a compressed gas regulator which incorporates the present invention.

Referring initially to FIG. 1, one form of a compressed gas regulator which incorporates the present invention is generally designated as 10. Regulator 10 includes a housing 12 having therein a high pressure chamber 14, a low pressure chamber 16 spaced from the high pressure chamber 14, and an orifice connecting the high pressure chamber 14 to the low pressure chamber 16. The low pressure chamber 16 is at an end of the housing 12 and has an open side. An inlet passage 20 extends through the housing 12 to the high pressure chamber 14, and an outlet passage 22 extends through the housing 12 from the low pressure chamber 16.

A bonnet 24 is mounted on the housing 12 and extends across the open end of the low pressure chamber 16. A flexible diaphragm 26 extends across the open end of the low pressure chamber 16 and has its periphery clamped between the housing 12 and the bonnet 24. The diaphragm 26 separates the low pressure chamber 16 from the interior of the bonnet 24. An adjustment knob 28 is threaded through the bottom of the bonnet 24. A biasing device (e.g. spring 30 under tension) is disposed within the bonnet 24 and is connected between the adjustment knob 28 and the diaphragm 26. The bonnet 24 is completely enclosed so as to form a sealed chamber 32 therein which is filled with a gas, preferably an inert or fire extinguishing gas, such as the noble gases, nitrogen, carbon dioxide and especially carbon tetraflouride and sulfur hexaflouride, under pressure.

A valve plug 34 is within the high pressure chamber 14 and is movable toward and away from the orifice 18. The valve plug 34 has a conical seating surface 36 which faces the end of the orifice 18. A rod 38 extends through the orifice 18 and is connected at one end to the valve plug 34 and at its other end to the diaphragm 26. Thus the valve plug 34 is connected to the diaphragm 26 so that movement of the diaphragm 26 moves the valve plug 34 toward and away from the orifice 18. A spring 40 is compressed between the valve plug 34 and the bottom of the high pressure chamber 14 so as to urge the valve plug 34 toward the orifice 18.

In the operation of the regulator 10 of the present invention, when the regulator 10 is set to zero delivery pressure ($P_d=0$), all of the reference gas force is balanced by the extended spring 30 such that:

$$P_r A = k(x - x_o)$$

where $P_r$ is the reference pressure of the gas in the bonnet chamber 32, A is the area of the diaphragm 26, k is the spring constant of the spring 30, x is the length of the extended spring 30, and $x_o$ is the free length of the spring 30. If the adjustment knob 28 is rotated to move it toward the diaphragm 26 a distance $\Delta x$, the spring extension is reduced from it initial value. The reference force ($P_r A$) then predominates and shifts the diaphragm 26 to move the plug valve seating surface 36 away from the orifice 18 and thereby open the control valve admitting delivered gas to act on the control surface of the diaphragm 26. Delivery pressure will increase to offset the reduced spring tension. A new equilibrium will be established when:

$$P_d A + k(x' - x_o) = P_r A \text{ where } x' < x$$

Thus, x decreases with increasing delivery pressure.

In the event that the diaphragm 26 should rupture or otherwise spring a leak, then the gas in the bonnet chamber 32, which is at a higher pressure than the pressure of the gas in the low pressure chamber 16, will flow into the low pressure chamber 16, thereby decreasing $P_r$. Ultimately $P_d$ and $P_r$ will equilibrate, and the only operating force on the valve plug 36 will be that of the spring 40 which then acts to move the valve plug 34 against the orifice 18 and close the regulator 10. Thus, there will be no external release of the gas being regulated. If the leak is due to a fire, then the prepressurized gas from the bonnet chamber 32 will flow into the combustion, and, if it is an inert gas or has extinguishing properties, may help to quench the combustion.

Figure 2:
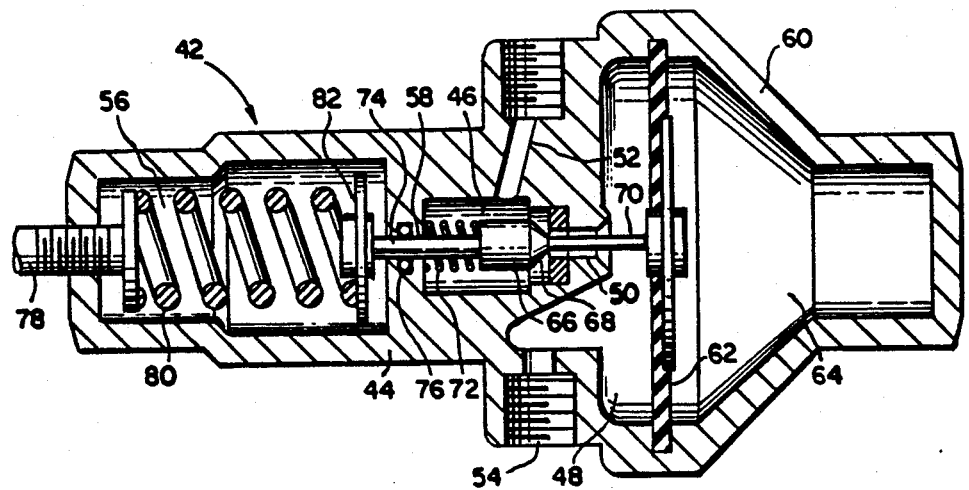
FIG. 2 is a sectional view of another form of a compressed gas regulator which incorporates the present invention.

Referring to FIG. 2, another form of a compressed gas regulator which incorporates the present invention is generally designated as 42. Regulator 42, like the pressure regulator 10 shown in FIG. 1, includes a housing 44 having a high pressure chamber 46, a low pressure chamber 48 spaced from the high pressure chamber 46, and an orifice 50 connecting the high pressure chamber 46 and the low pressure chamber 48. An inlet passage 52 extends through the housing 44 to the high pressure chamber 46, and an outlet passage 54 extends through the housing 44 from the low pressure chamber 48. The housing 44 also has a control chamber 56 therein on the side of the high pressure chamber 46 opposite the low pressure chamber 48. A passage 58 extends through the housing 46 between the control chamber 56 and the high pressure chamber 46.

The low pressure chamber 48 has an open end, and an enclosed bonnet 60 is mounted on the housing 44 across the open end of the low pressure chamber 48. A flexible diaphragm 62 extends across the open end of the low pressure chamber 48 and has its periphery clamped between the housing 44 and the bonnet 60. The diaphragm 62 separates the low pressure chamber 48 from the bonnet 60 to provide the bonnet 60 with an enclosed chamber 64. The bonnet chamber 64 is filled with a gas under pressure.

A valve plug 66 is in the high pressure chamber 46 and has a conical seating surface 68 facing the orifice 50. A connecting rod 70 extends through the orifice 50 and is connected at one end to the valve plug 66 and at its other end to the diaphragm 62. Thus, the valve plug 66 is connected to the diaphragm 62 for movement toward and away from the orifice 50. A spring 72 is compressed between the back of the valve plug 66 and the bottom of the high pressure chamber 46 and urges the valve plug 66 toward the orifice 50.

A rod 74 extends through the passage 58 between the control chamber 56 and the high pressure chamber 46. The rod 74 is connected at one end to the back of the valve plug 66. A sealing ring 76 extends around the rod 74 and seals the space between the rod 74 and the passage 58. An adjustment knob 78 extends through the housing 44 into the control chamber 56, and a biasing means (e.g. spring 80) is disposed within the control chamber 56 and is compressed between the adjustment knob 78 and a plate 82 on the end of the rod 74.

The regulator 42 operates in substantially the same manner as the regulator 10 previously described. However, in the regulator 42 the adjustment knob 78 varies the compression of the spring 80 to vary its force applied to the diaphragm 62. Thus, the compression of the spring 80 is adjusted so that its force on the diaphragm 62 is less than the force applied by the gas in the bonnet chamber 64. This causes the diaphragm 62 to move the valve plug 66 away from the orifice 50 an allow gas to flow from the high pressure chamber 66 through the orifice 50 into the low pressure chamber 48 and out the outlet passage 54. The compression of the spring 80 is controlled so that its force on the diaphragm 62 plus the force applied by the pressure of the gas admitted into the low pressure chamber 48 is sufficiently less than the pressure of the gas in the bonnet chamber 64 to maintain the seating surface 68 of the valve plug 66 a desired distance from the orifice 50. The spacing of the valve plug seating surface 68 from the orifice 50 controls the drop in pressure of the gas being regulated as it passes from the high pressure chamber 46 to the low pressure chamber 48.

In the event that the diaphragm 62 ruptures, the gas in the bonnet chamber 64, which is at a higher pressure than the gas in the low pressure chamber 48, will flow through the rupture into the low pressure chamber 48 until the pressure on both sides of the diaphragm 62 is the same. Springs 72 and 80 will then force the valve plug 66 against the orifice 50 and close the regulator so that no gas will be discharged from the regulator 42 into the atmosphere.

Although the gas pressure regulators of the present invention have been shown as having flexible diaphragms as the pressure sensing/control element, other types of pressure sensing/control elements, such as a piston, can be used instead of the diaphragm. Also, the present invention can be used in regulators having other arrangements of the various chambers. No matter what arrangement of the chambers or type of pressure sensing/control element is used, the regulator must have an enclosed bonnet on the side of the pressure sensing/control element opposite the low pressure chamber with the pressure of the gas in the bonnet being greater than the highest pressure which can be expected in the low pressure chamber, the delivery pressure. Also, the control spring, whether under tension or compression, must apply a force on the pressure sensing/control element in a direction to the force applied by the gas in the bonnet and in the same direction as the force applied by the delivery pressure. Thus, the force applied by the spring on the pressure sensing/control element plus the force by the delivery pressure will balance the force applied by the gas in the bonnet chamber to place the valve plug in a position to provide the desired delivery pressure.

Thus, there is provided by the present invention a gas pressure control regulator having an enclosed bonnet which is filled with a gas under pressure and which acts on the pressure sensing/control element to control the pressure of the gas passing through the regulator. However, in the event of any leakage across the pressure sensing/control element, either by rupture or any other reason, the gas in the bonnet will cause the regulator to close and prevent the discharge of the gas being regulated into the atmosphere. Also, if the gas in the bonnet is an inert gas it can be used to help extinguish any fire that may occur in the regulator. Including the gas filled bonnet in a regulator can be achieved with little change in the structure of a standard regulator so as to be easy to manufacture with little increase in the cost of the regulator.

What is claimed is:

1. A compressed gas regulator comprising: a housing having high pressure chamber, a low pressure chamber spaced from the high pressure chamber and an orifice extending between the high pressure chamber and the low pressure chamber;
   a valve plug in the high pressure chamber and movable toward and away from the orifice;
   a completely sealed bonnet mounted on said housing across the low pressure chamber;
   a movable pressure sensing/control element extending across the low pressure chamber and separating the low pressure chamber from the bonnet;
   means connecting the pressure sensing/control element to said valve plug;
   a gas at a uniform pressure filling said bonnet and applying a uniform pressure on said pressure sensing/control element, said gas being an inert or fire extinguishing gas so as to extinguish any fire which may occur in the regulator; and
   adjustable biasing means for applying a force on said pressure sensing/control element in a direction opposite to the force applied by the gas in the bonnet and to permit variation of the applied force.

2. A gas regulator in accordance with claim 1 in which the biasing means applying a force on the pressure sensing/control element includes a spring connected to said pressure sensing/control element and means for adjusting the force applied by said spring.

3. A gas regulator in accordance with claim 2 in which the gas in the bonnet is at a pressure greater than the highest expected pressure of the gas in the low pressure chamber.

4. A gas regulator in accordance with claim 3 in which the pressure sensing/control element is a flexible diaphragm extending across low pressure chamber.

5. A gas regulator in accordance with claim 4 in which the means connecting the valve plug with the flexible diaphragm comprises a rod extending through the orifice.

6. A gas regulator in accordance with claim 5 including a spring in the high pressure chamber compressed between the valve plug and the wall of the high pressure chamber.

7. A gas regulator in accordance with claim 2 in which the spring connected to the pressure sensing/control element is a tension spring connected at one end to the side of the pressure sensing/control element which is exposed to the gas in the bonnet and the means for adjusting the tension of the spring is an adjustment knob connected to the other end of the spring.

8. A gas regulator in accordance with claim 2 in which the spring connected to the pressure sensing/control element is a compression spring connected to the side of the pressure sensing/control element which is exposed to the gas in the low pressure chamber and the means for adjusting the compression of the spring is an adjustment knob connected to the other end of the spring.

9. A gas regulator in accordance with claim 8 in which the housing has a control chamber there on the side of the high pressure chamber opposite the low pressure chamber, the compression spring is in the control chamber and the adjustment knob is threaded through the housing into the control chamber and is connected to an end of the compression spring.

10. A gas regulator in accordance with claim 9 in which the housing includes a passage extending between the control chamber and the high pressure chamber, and a rod extends through the passage and is connected at one end to the plug valve and at its other end to the compression spring.

11. A gas regulator in accordance with claim 10 in which the pressure sensing/control element is a flexible diaphragm extending across the low pressure chamber.

* * * * *